US011934244B2

(12) United States Patent
Black et al.

(10) Patent No.: US 11,934,244 B2
(45) Date of Patent: Mar. 19, 2024

(54) LOW BATTERY SWITCHOVER

(71) Applicant: Sony Interactive Entertainment Inc., Tokyo (JP)

(72) Inventors: Glenn Black, San Mateo, CA (US); Michael Taylor, San Mateo, CA (US); Javier Fernandez Rico, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 517 days.

(21) Appl. No.: 16/294,560

(22) Filed: Mar. 6, 2019

(65) Prior Publication Data

US 2020/0285291 A1    Sep. 10, 2020

(51) Int. Cl.
| | |
|---|---|
| *G06F 1/26* | (2006.01) |
| *A63F 13/235* | (2014.01) |
| *A63F 13/24* | (2014.01) |
| *A63F 13/533* | (2014.01) |
| *A63F 13/537* | (2014.01) |
| *G06F 1/16* | (2006.01) |
| *G06F 1/28* | (2006.01) |

(52) U.S. Cl.
CPC .............. *G06F 1/266* (2013.01); *G06F 1/263* (2013.01); *G06F 1/28* (2013.01); *A63F 13/235* (2014.09); *A63F 13/533* (2014.09); *A63F 2300/1031* (2013.01); *A63F 2300/308* (2013.01)

(58) Field of Classification Search
CPC . G06F 1/266; G06F 1/263; G06F 1/28; A63F 13/235; A63F 13/533
See application file for complete search history.

(56) References Cited

U.S. PATENT DOCUMENTS

| 10,261,564 B1* | 4/2019 | Gollakota | G06F 9/4451 |
|---|---|---|---|
| 2003/0092493 A1* | 5/2003 | Shimizu | A63F 13/533 |
| | | | 463/43 |
| 2004/0224768 A1* | 11/2004 | Hussaini | A63F 13/24 |
| | | | 463/37 |
| 2008/0119273 A1 | 5/2008 | Yamada et al. | |
| 2009/0258713 A1 | 10/2009 | Albouyeh et al. | |
| 2010/0135642 A1* | 6/2010 | Song | H04N 19/44 |
| | | | 386/241 |
| 2011/0118023 A1* | 5/2011 | Fu | G06F 21/32 |
| | | | 463/37 |
| 2011/0190050 A1* | 8/2011 | Mae | A63F 13/00 |
| | | | 463/31 |

(Continued)

OTHER PUBLICATIONS

International Search Report and Written Opinion from the counterpart PCT application PCT/US20/019387 dated Jun. 5, 2020.

*Primary Examiner* — Jaweed A Abbaszadeh
*Assistant Examiner* — Gayathri Sampath
(74) *Attorney, Agent, or Firm* — John L. Rogitz

(57) ABSTRACT

A warning is generated when a computer simulation controller is determined to have insufficient charge to permit use through an upcoming simulation sequence. Thus, responsive to a computer simulation having a first context and a computer simulation controller having a first voltage, a human-perceptible indication of low voltage is presented, whereas if the computer simulation has a second context typically requiring less input than the first context, no indication is presented if the controller has the same first voltage.

7 Claims, 5 Drawing Sheets

Overall logic

(56) References Cited

U.S. PATENT DOCUMENTS

| | | | | |
|---|---|---|---|---|
| 2012/0258691 | A1* | 10/2012 | Baer | H04M 1/72448 |
| | | | | 455/412.2 |
| 2012/0306655 | A1* | 12/2012 | Tan | G06F 1/28 |
| | | | | 340/636.1 |
| 2015/0094142 | A1* | 4/2015 | Stafford | G06F 3/011 |
| | | | | 463/31 |
| 2015/0323974 | A1* | 11/2015 | Shuster | G08B 21/182 |
| | | | | 713/320 |
| 2016/0036260 | A1* | 2/2016 | Nunez | H02J 7/0063 |
| | | | | 320/136 |
| 2016/0042566 | A1* | 2/2016 | Mao | A63F 13/211 |
| | | | | 463/31 |
| 2016/0088419 | A1* | 3/2016 | Annapureddy | H04W 4/60 |
| | | | | 455/414.1 |
| 2017/0149633 | A1* | 5/2017 | Arulesan | G06F 11/3062 |
| 2018/0104583 | A1* | 4/2018 | Sato | A63F 13/40 |
| 2018/0287417 | A1* | 10/2018 | Zeine | H02J 7/00714 |

* cited by examiner

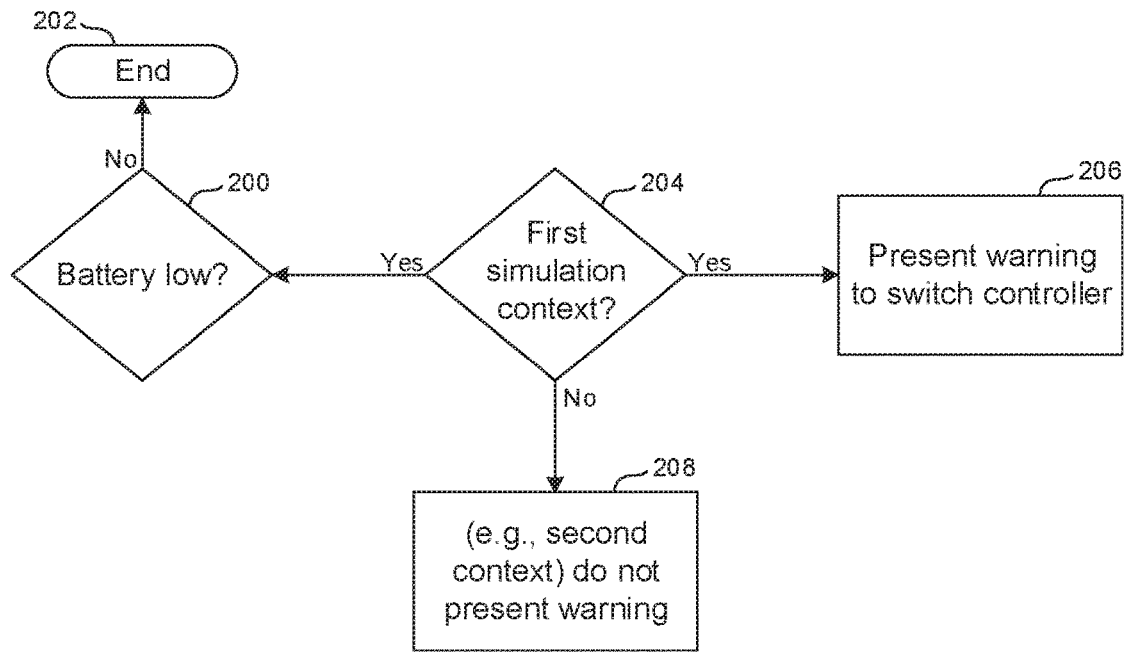
FIG. 2   Overall logic
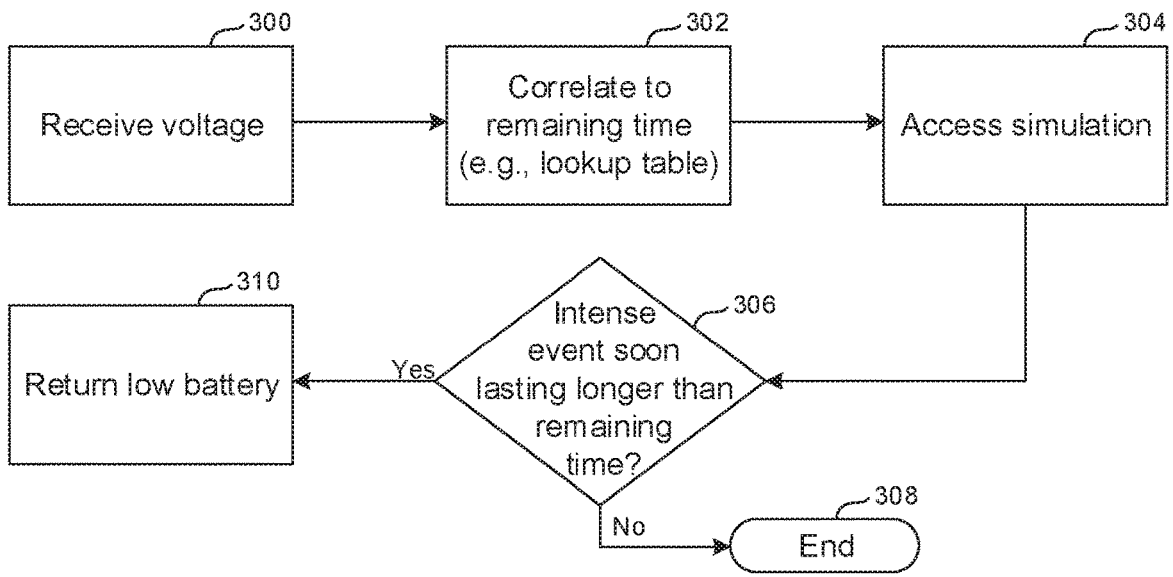
FIG. 3   Logic for determining if battery is low

LOW BATTERY SWITCHOVER

FIELD

The application relates to low battery switchover of computer simulation controllers

BACKGROUND

Video simulation such as video gaming is growing in popularity. As understood herein, simulations are played with game controllers that are typically powered by rechargeable batteries.

SUMMARY

As understood herein, depending on computer simulation context, a simulation controller with a particular battery may or may not have enough power left prior to recharging to complete play of the simulation.

Accordingly, a device includes at least one computer memory that is not a transitory signal and that in turn includes instructions executable by at least one processor to, responsive to a computer simulation having a first context and a computer simulation controller having a first voltage, present a human-perceptible indication of low voltage. The instructions are also executable to, responsive to the computer simulation having a second context and the computer simulation controller having the first voltage, not present the human-perceptible indication of low voltage.

In examples, the first context includes at least one simulation event associated with a period greater than a period of use associated with the first voltage.

In some examples, the instructions may be executable to, responsive to an active computer simulation controller having a voltage satisfying a low voltage threshold, generate a human-perceptible indication of a spare computer simulation controller, and responsive to input received from the spare computer simulation controller, automatically execute a log in of at least one of: a user, and/or the spare computer simulation controller.

In another aspect, a device includes at least one computer memory that is not a transitory signal and that in turn includes instructions executable by at least one processor to, responsive to an active computer simulation controller having a voltage satisfying a low voltage threshold, generate a human-perceptible indication of a spare computer simulation controller. The instructions are executable to, responsive to input received from the spare computer simulation controller, automatically execute a log in of at least one of: a user, and/or the spare computer simulation controller.

In another aspect, a method includes, responsive to a computer simulation having a first context and a computer simulation controller having a first voltage, presenting a human-perceptible indication of low voltage. On the other hand, the method also includes, responsive to the computer simulation having a second context and the computer simulation controller having the first voltage, not presenting the human-perceptible indication of low voltage.

The details of the present application, both as to its structure and operation, can best be understood in reference to the accompanying drawings, in which like reference numerals refer to like parts, and in which:

BRIEF DESCRIPTION OF THE DRAWINGS

FIG. 2 is a flow chart of example overall logic consistent with present principles;

FIG. 3 is a flow chart of example battery voltage determination logic consistent with present principles;

DETAILED DESCRIPTION

Figure 1:
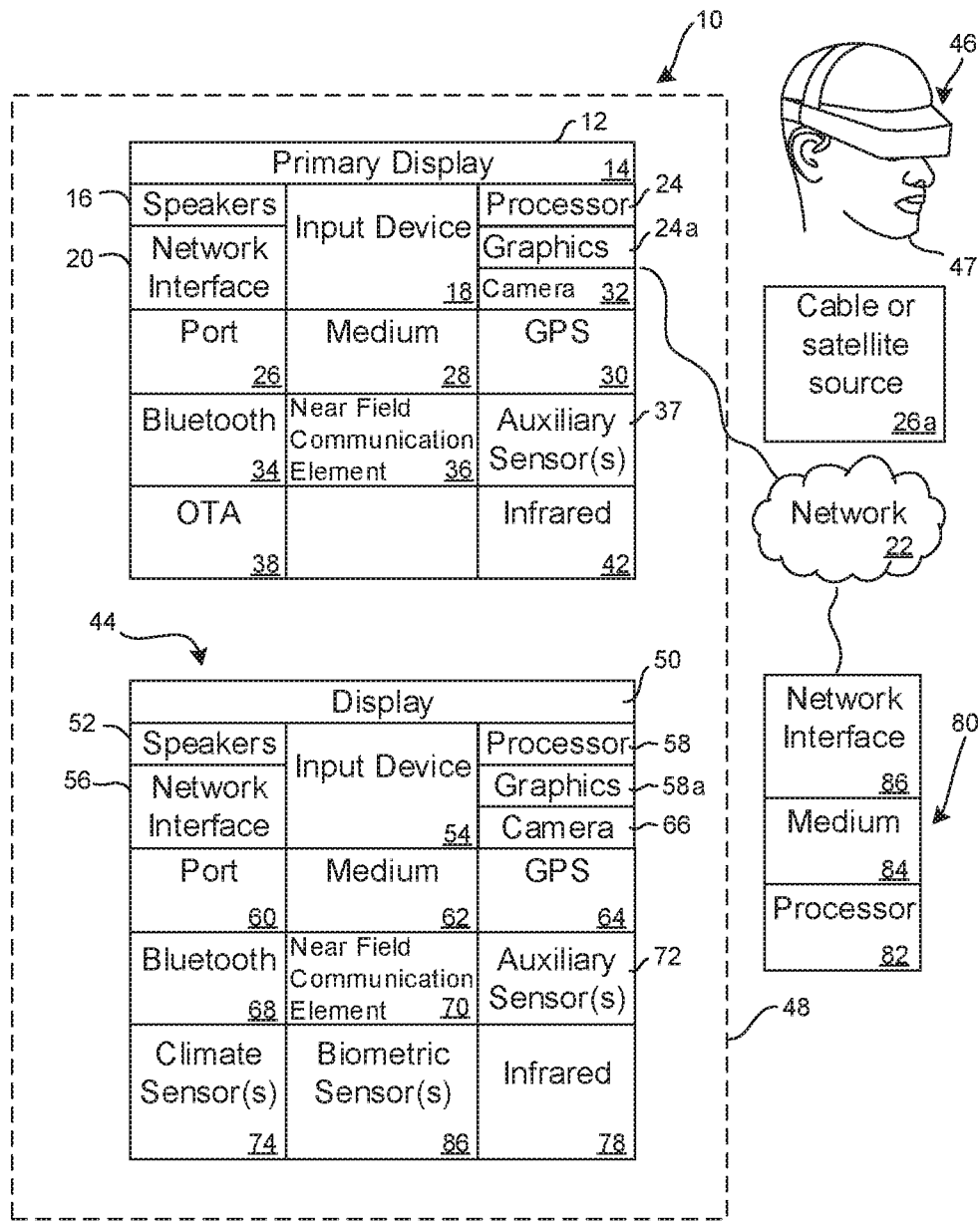
FIG. 1 is a block diagram of an example system including an example in accordance with present principles.

This disclosure relates generally to computer ecosystems including aspects of consumer electronics (CE) device networks such as but not limited to computer simulation networks such as computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local et or a virtual private network A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Any of the cameras described herein may employ the high spectrum camera example or multiple examples described further below.

Also included on the AVD 12 may be a Bluetooth transceiver 34 and other Near Field Communication (NFC) element 36 for communication with other devices using Bluetooth and/or NFC technology, respectively. An example NFC element can be a radio frequency identification (MD) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc. providing input to the CE device processor 58, The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk chive, CD RUM or Flash drive. The software code instructions may also be downloaded over the Internet.

Now referring to FIG. 2, example logic may be seen for assisting a user of a simulation controller when low battery conditions exist in the controller, depending on the current context of the simulation. Commencing at state 200 it is determined whether a controller battery is low on energy using, e.g., battery voltage in some implementations. This may be done by comparing the voltage to first, relatively high threshold, above which the controller is assumed to have enough energy to play most simulations for a considerable time, which when being the case causes the logic to end at state 202.

On the other hand, when battery voltage reaches a level below the threshold tested for at state 200, the logic may move to state 204 to determine whether the current simulation context is a context in which play can be expected to exceed the remaining energy in the battery of the controller. For example, the context may be that a simulation event associated with a period greater than a period of use associated with the voltage is upcoming, e.g., a prolonged simulated battle. To continue the example, if the player is about to enter a boss fight that the simulation console knows takes an average of fifteen minutes to play and the console determines that there is only twelve minutes of battery left on the active controller, the logic returns a positive response at state 204, causing the logic to move to block 206 to present a warning to switch to a different controller before the intensity of play increases. As described further below, the warning may be presented visually on a display, aurally on a speaker, tactilely using a haptic element on the controller, or combinations of the above.

On the other hand, if the context at state 204 is determined to be a different context for which no low battery warning is indicated, the logic moves to state 208 to not present warning. For example, if sufficient battery life exists to play an upcoming scene in the simulation, no warning need be generated. Yet again, it may be that sufficient battery life does not exist to play an upcoming scene, but the context nonetheless may indicate that no warning should be presented of low battery. An example of such a context is that the user is already in the middle of intense gameplay, in which case no warning is presented so as not to add stress by warning the user of low battery.

Thus, responsive to the computer simulation having a first context and a computer simulation controller battery having a first voltage, a human-perceptible indication of low voltage may be presented, whereas responsive to the computer simulation having a second context and the computer simulation controller having the same, first voltage, the human-perceptible indication of low voltage is not presented. Note that in addition to presenting a low battery warning as described, in situations of low voltage in the controller, haptic feedback/rumble, force feedback, lights, etc. on the controller may be disabled to essentially enter a battery-saving mode while still allowing completion of play.

For example, a given voltage may not result in a low voltage warning responsive to signals from the simulation to indicate an upcoming scene that is associated with a playing time of under ten seconds, whereas the same voltage may result in a warning responsive to signals from the simulation to indicate an upcoming scene that is associated with a playing time in excess of ten seconds. A given voltage may not result in a low voltage warning responsive to signals from the simulation to indicate an upcoming scene that is associated with a playing time of under two minutes, whereas the same voltage may result in a warning responsive to signals from the simulation to indicate an upcoming scene that is associated with a playing time in excess of two minutes. A given voltage may not result in a low voltage warning responsive to signals from the simulation to indicate an upcoming scene that is associated with a playing time of under five minutes, whereas the same voltage may result in a warning responsive to signals from the simulation to indicate an upcoming scene that is associated with a playing time in excess of five minutes.

Continuing, a given voltage may not result in a low voltage warning responsive to signals from the simulation to indicate a scene that is associated with an input of user signals from the controller of less than five inputs, whereas the same voltage may result in a warning responsive to signals from the simulation to indicate a scene that is associated with an input of user signals from the controller of more than five inputs. A given voltage may not result in a low voltage warning responsive to signals from the simulation to indicate a scene that is associated with an input of user signals from the controller of less than twenty inputs, whereas the same voltage may result in a warning responsive to signals from the simulation to indicate a scene that is associated with an input of user signals from the controller of more than twenty inputs. A given voltage may not result in a low voltage warning responsive to signals from the simulation to indicate a scene that is associated with an input of user signals from the controller of less than one hundred inputs, whereas the same voltage may result in a warning responsive to signals from the simulation to indicate a scene that is associated with an input of user signals from the controller of more than one hundred inputs.

Combinations of the above non-limiting example correlations may be implemented.

The above correlations of simulation contexts to battery life (e.g., remaining voltage) may be derived using an artificial intelligence mechanism such as a neural network to identify patterns of simulation play for a particular user and how long the user's simulation sessions last. In this way, how particular users play can be a factor for determining when to switch controllers and/or provide charge reminders.

Indeed, and turning now to FIG. 3 for example logic pertaining to determining voltage, commencing at block 300 an indication is received, e.g., by a simulation console such as a Sony PlayStation® console, from a battery-powered controller indicating the current voltage of the battery in the controller. The signal may be sent via wired or wireless link. Moving to block 302 a lookup table may be accessed using the voltage as entering argument to correlate the voltage to a remaining time of use prior to recharging the battery. The simulation being played by the console on a display device is accessed at block 304, and at state 306 it is determined whether an event in the simulation that is upcoming, e.g., an intense play event, is expected to last longer than the time period from block 302. The period of play of the upcoming event may be indicated in the simulation itself or derived using AI as described above. If the period of play will not exceed the remaining life indicated from block 302, the logic may end at state 308, but otherwise the logic can move to block 310 to return the low battery warning.

Figure 4:
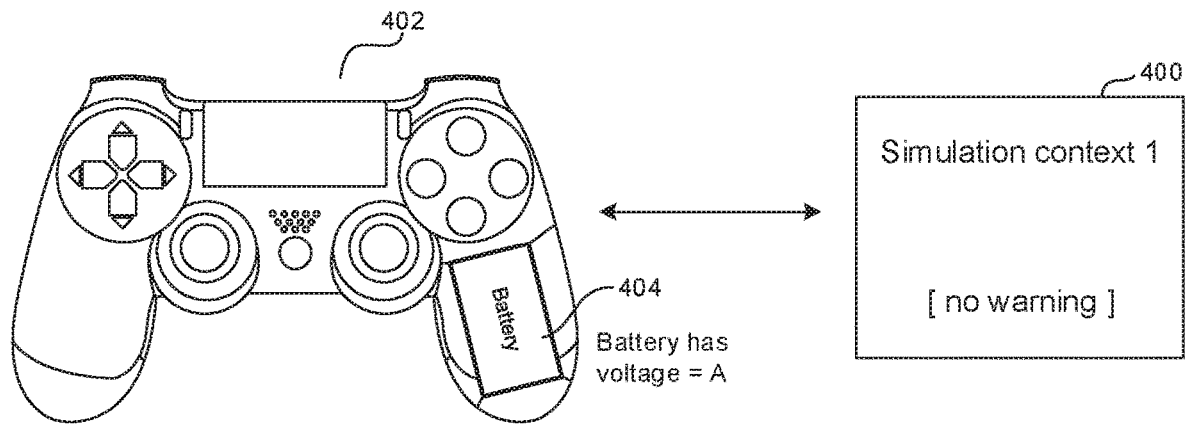
FIG. 4 is a screen shot of an example simulation context in which a particular battery voltage does not result in a warning.
Figure 5:
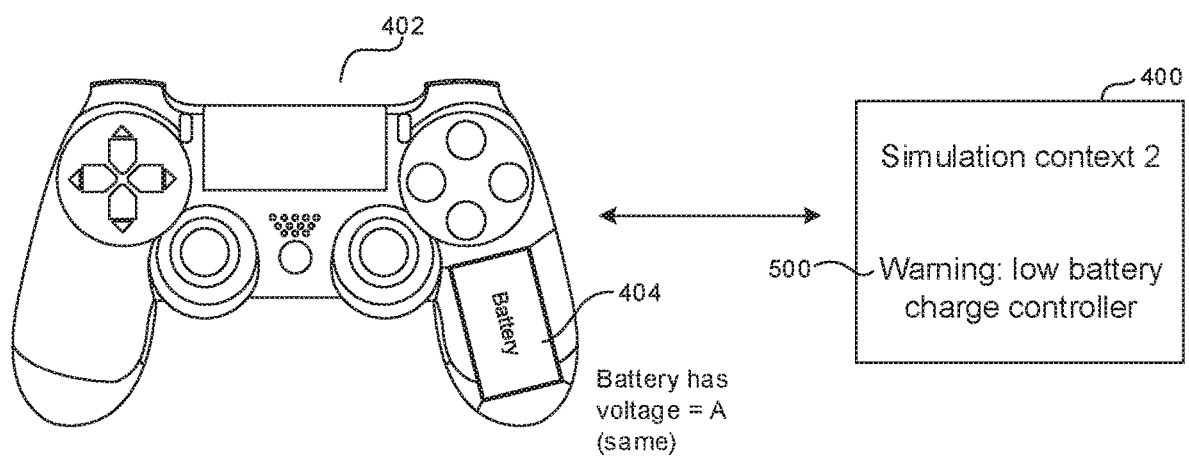
FIG. 5 is a screen shot of an example simulation context in which the same battery voltage as in FIG. 4 results in a warning.

FIGS. 4 and 5 illustrate principles described above. In FIG. 4, a simulation is presented on a display device 400. The simulation has a first context in which a controller 402 with battery 404 has sufficient charge left to play the context, in which case no warning is presented. On the other hand, in FIG. 5 the battery 404 can have the same voltage as in FIG. 4, but because the context of the simulation being presented on the display 400 is a different, more intense or time-consuming context than that assumed in FIG. 3, a warning 500 is presented that the battery has low voltage and the user should change controllers.

Figure 6:
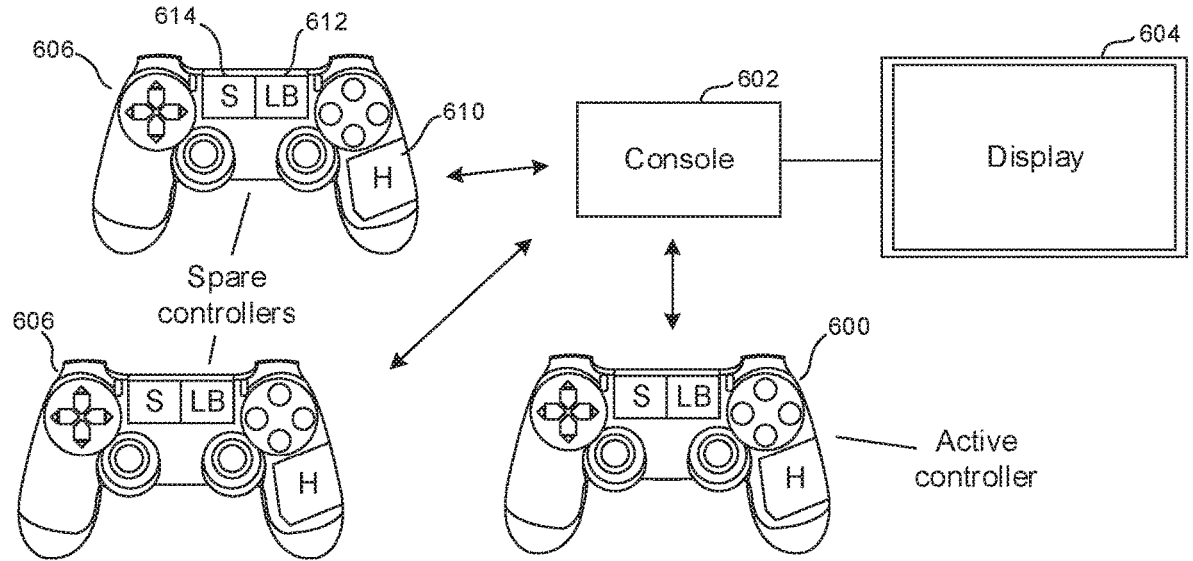
FIG. 6 is a schematic diagram of an active controller and multiple spare controllers.
Figure 7:
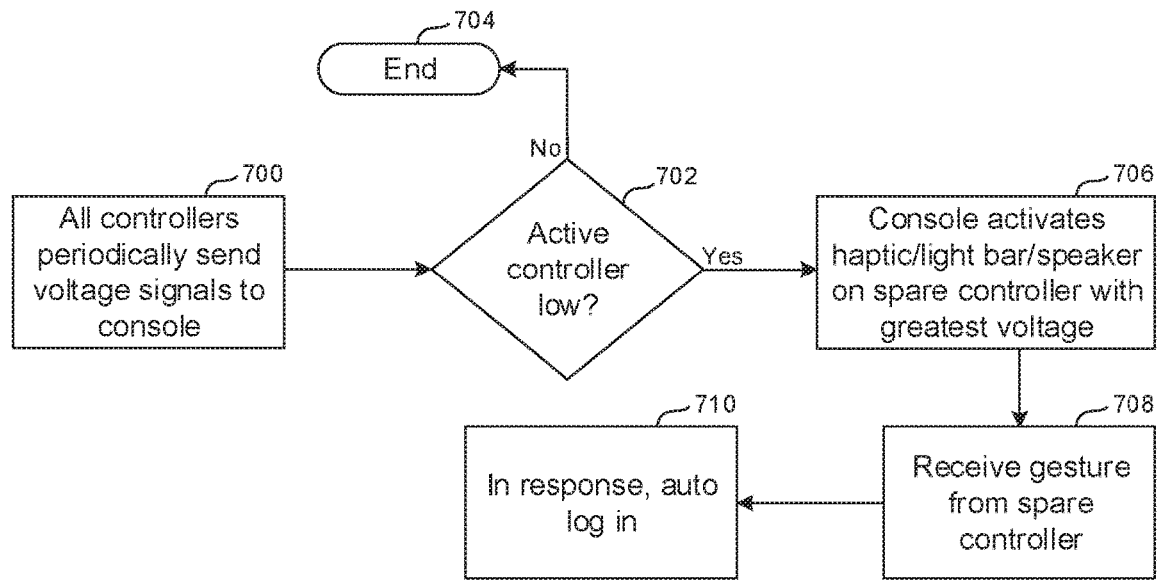
FIG. 7 is a flow chart of example logic consistent with FIG. 6.

FIGS. 6 and 7 provide further description consistent with present principles. In FIG. 6, an active controller 600 is shown communicating simulation play signals to a simulation console 602 for presenting a computer simulation on a display 604. Spare controller 606 also are illustrated, communicating their battery voltages to the console 602 as indicated by the arrows 608. Each controller 606 may include one or more haptic generators 610, lamps such as light bars 612, and speakers 614 for outputting human-perceptible indications of low battery, among other indications.

FIG. 7 illustrates logic consistent with FIG. 6. At block 700 all controllers shown in FIG. 6 can send signals to the console 602 indicating the voltages of their respective batteries. At state 702 it is determined whether the active controller 600 has a low battery consistent with principles described herein. If not the logic ends at state 704, but otherwise the logic can move to block 706 to generate a warning of low battery such as any warning describe herein, including activating one or more of the haptic generator 610 of the spare controller 606 with the highest battery voltage, or the lamp 612 of the spare controller 606, or the speaker 614 (to emit a beep, for example) of the controller 606. The simulation may also be automatically paused at block 706 to allow the user a few moments to access a spare controller 606.

Moving from block 706 to block 708, the logic may receive a gesture from a spare controller, such as a shaking or other manipulation of the spare controller. This indicates that the user has heeded the warning and has commenced use of the spare controller. Proceeding to block 710, in response to the gesture the user and/or spare controller are automatically logged on so that the user need not re-log on to the simulation system. The simulation may then be automatically re-started if it had been paused at block 706.

Figure 8:
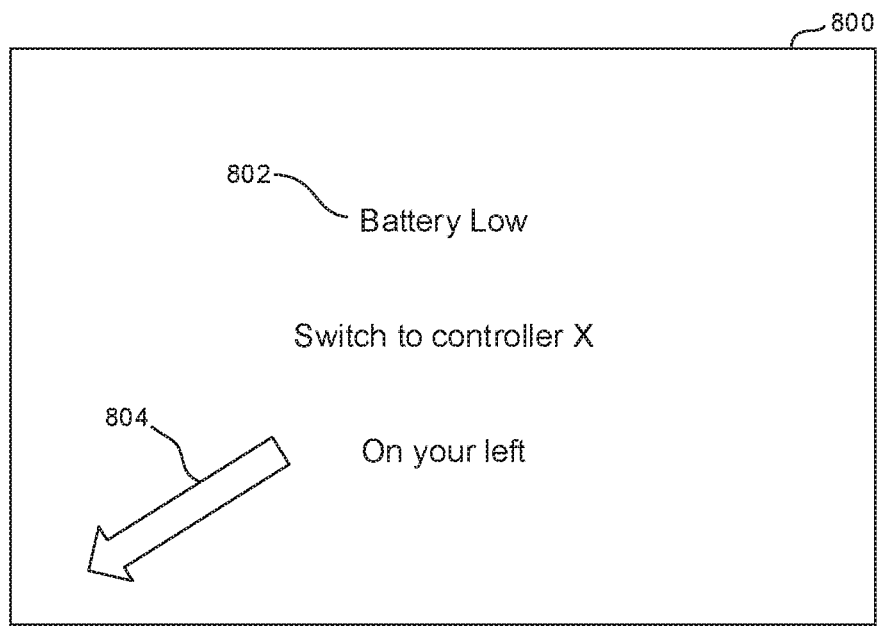
FIG. 8 is a screen shot of a user interface consistent with FIG. 7.

FIG. 8 illustrates that at block 706 in FIG. 7, in addition to or in lieu of the indications described above of low voltage, the simulation console may present on a display 800 a graphic and/or textual indication 802 of low battery voltage in the active controller, along with a graphic and/or textual indication 804 to switch to a spare controller with an indication of where the spare controller is, as may be determined using, e.g., global position satellite (GPS) signals from the spare controller, or triangulation of signals received from the spare controller, or other means.

If controllers are not changed out, upon completion of game play a reminder may be presented, e.g., on the display 800 to charge all controllers. A reminder may also be presented to plug in a low battery controller to recharge its battery when the UI of FIG. 8 is presented.

It will be appreciated that whilst present principals have been described with reference to some example embodiments, these are not intended to be limiting, and that various alternative arrangements may be used to implement the subject matter claimed herein.

What is claimed is:

1. A device comprising:
   at least one computer memory that is not a transitory signal and that comprises instructions executable by at least one processor to:
   responsive to a computer simulation indicating a first context and a computer simulation controller having a first voltage, present a human-perceptible indication of low voltage;
   responsive to the computer simulation indicating a second context and the computer simulation controller having the first voltage, not present the human-perceptible indication of low voltage;
   execute the computer simulation for presentation on at least one display responsive to input from the computer simulation controller; wherein
   the second context comprises: a user of the simulation controller is engaged in gameplay satisfying an intensity threshold.

2. The device of claim 1, comprising the at least one processor.

3. The device of claim 1, comprising at least one display device configured for control by the at least one processor to present a computer simulation.

4. The device of claim 1, comprising the computer simulation controller.

5. The device of claim 1, wherein the first context comprises at least one simulation event associated with a period greater than a period of use associated with the first voltage.

6. The device of claim 1, wherein the instructions are executable to:
   responsive to an active computer simulation controller having a voltage satisfying a low voltage threshold, generate a human-perceptible indication of a spare computer simulation controller; and
   responsive to input received from the spare computer simulation controller, automatically execute a log in of at least one of: a user, and/or the spare computer simulation controller.

7. A method, comprising:
responsive to a computer simulation indicating a first context and a computer simulation controller having a first voltage, presenting a human-perceptible indication of low voltage;
execute the computer simulation for presentation thereof on at least one display according to input from the computer simulation controller; and
responsive to the computer simulation indicating a second context and the computer simulation controller having the first voltage, not presenting the human-perceptible indication of low voltage, wherein indicating the first context comprises at least one signal from the computer simulation indicating a scene from the computer simulation that is associated with a first number of user inputs and indicating the second context comprises at least one signal from the computer simulation indicating a scene from the computer simulation that is associated with a second number of user inputs.

* * * * *